Patented Aug. 11, 1931

1,817,992

UNITED STATES PATENT OFFICE

RICHARD LEOPOLD, OF FRANKFORT-ON-THE-MAIN-HOCHST, AND MAX PAQUIN, OF KOENIGSTEIN I/TAUNUS, GERMANY, ASSIGNORS TO GENERAL ANILINE WORKS, INC., OF NEW YORK, N. Y., A CORPORATION OF DELAWARE

UREA DERIVATIVE OF THE 1.3-BUTYLENE-GLYCOL AND PROCESS OF PREPARING THEM

No Drawing. Application filed November 7, 1929, Serial No. 405,533, and in Germany November 16, 1928.

The present invention relates to crystallizing urea derivatives of the 1.3-butylene-glycol and to a process of preparing them.

It is known that by causing alcohols to react with urea the well defined crystallized allophanic acid esters and urethanes are obtained. As is described in U. S. Patent Application Ser. No. 223,232, filed on September 30, 1927, in the name of Max Paquin, these crystallized compounds are not easily obtained in all cases, on the contrary it is for the most part impossible to isolate these compounds when using polyvalent alcohols. In this case there are on the one side isolated crystallized products in which two intermediarily formed polyurethane-molecules are assumed to be linked together by an imino bridge, with elimination of ammonia, as indicated in the following general formula:

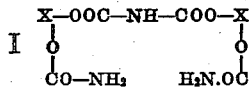

wherein X stands for two or several methylene-groups of different molecules.

Thus, for instance, by using ethylene glycol, a compound of the above scheme is isolated which melts at 235° C. On the other side of the condensation continues with further splitting off of ammonia and carbon dioxide, whereby cyclic compounds of the following general formula:

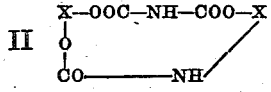

wherein X stands for two or several methylene-groups of different molecules, are formed. At this operation resinous amorphous products are obtained. By using polyvalent alcohols as, for instance, glycerin, sorbite or the like, generally neither the urethane is obtained nor the intermediate product composed according to formula I, there are rather formed almost only the substances composed according to formula II. When trying to obtain the hitherto unknown 1.3-butylene-diurethane by causing 1 mol of 1.3-butylene-glycol to react with 2 mols of urea there are obtained—especially when applying elevated temperatures—mixtures containing besides mono- and diurethane a great quantity of amorphous by-products. When working up the said mixtures the yields of diurethane are only small.

Now we have found that by using an excess of butylene-glycol and applying temperatures advantageously between 100° C. and 200° C., reaction products are obtained which contain besides the excess of unaltered butylene-glycol only mono- and diurethane of the following general formula:

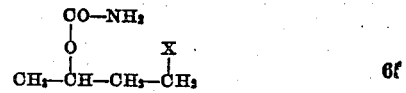

wherein X stands for hydroxyl or the residue $NH_2-CO-O-$.

The reaction may also be carried out while using high-boiling diluents and solvents having a boiling point above 200° C., such, for instance, as nitrobenzene.

The reaction mixture is then worked up in the usual manner in order to obtain the well crystallizing diurethane.

The 1.3-butylene-diurethane has proved to be a very suitable admixture to vat dyestuffs in cloth printing.

The following example serves to illustrate our invention, but it is not intended to limit it thereto; the parts being by weight:

A mixture of 500 parts of 1.3-butyleneglycol and 200 parts of urea is heated to 170° C. to 180° C. which temperature is maintained while stirring. The reaction mixture is boiled for 4 hours with considerable evolution of ammonia. The solution is then distilled over in the vacuum. Up to a temperature of 145° C. under a pressure of 10 mm almost pure butylene-glycol distils (about 215 parts), from 145° C. to 200° C. at 10 mm pressure a fraction is obtained which consists for the most part of butylene-monourethane (about 250 parts) boiling at 170° C. to 180° C. under a pressure of 10 mm. The residue is mixed while still being warm with the equal quantity of water, allowed to stand for a prolonged time, then filtered by suction, once more covered with ice-water and dried. 128 parts of practically pure diurethane are obtained which correspond to a yield of 43,7 per cent of the theory. By evaporation of the water filtrates there can be obtained a further quantity of mono-urethane which, together with that prepared by distillation, can be worked up into diurethane by means of butylene-glycol and urea.

The 1.3-butylene-diurethane has the following formula:

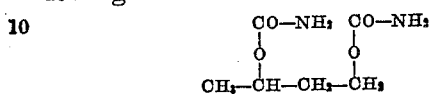

and represents a well crystallizing salt melting at 152° C. and boiling at 260° C. At a temperature of about 230° C. it begins to decompose while splitting off ammonia and carbon dioxide whereby amorphous, yellow water-soluble masses are formed. It difficultly dissolves in cold water, cold alcohol or cold acetone, but readily dissolves in hot water, hot alcohol or hot acetone; it is insoluble in ether, benzene and benzine.

We claim:

1. The process which comprises causing urea to react at a temperature of between 100° C. and 200° C. with a molecular excess of 1.3-butylene-glycol.

2. The process which comprises causing urea to react at a temperature of between 100° C. and 200° C. with a molecular excess of 1.3-butylene-glycol in the presence of a solvent having a boiling point above 200° C.

3. The process which comprises causing two molecules of urea to react at a temperature of between 170° C. and 180° C. with a molecular excess of 1.3-butylene-glycol.

4. As new products, compounds of the following general formula:

wherein X stands for hydroxyl or the residue $NH_2-CO-O-$.

5. As a new product, 1.3-butylene-diurethane which represents a crystalline body melting at 152° C. and boiling at 260° C., being difficultly soluble in cold water, cold alcohol or cold acetone, readily soluble in hot water, hot alcohol or hot acetone, but insoluble in ether, benzene or benzine.

In testimony whereof, we affix our signatures.

RICHARD LEOPOLD.
MAX PAQUIN.